(No Model.)
T. P. TOWNLEY.
SEED COTTON CLEANER.
No. 460,669. Patented Oct. 6, 1891.
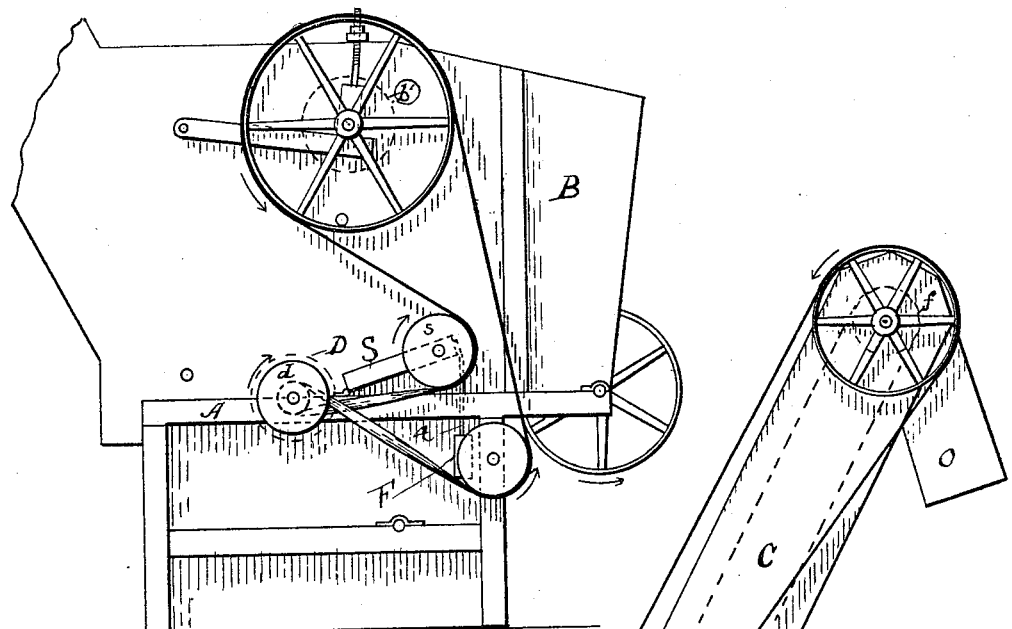
Fig. 2.
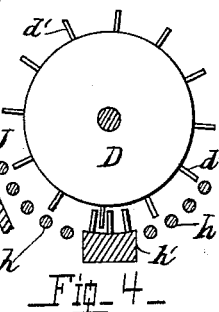
Fig. 4.
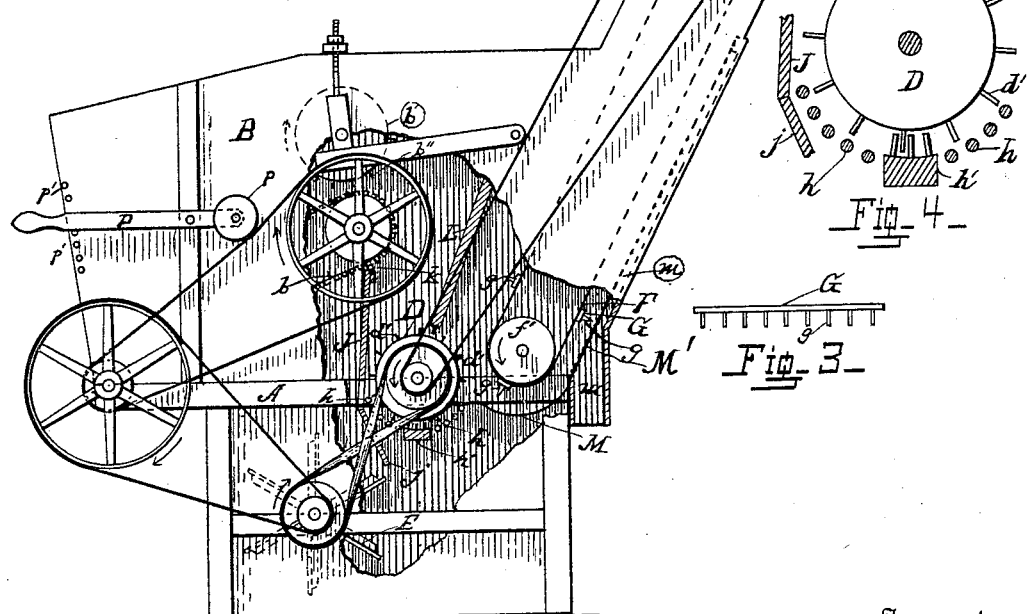
Fig. 3.
Fig. 1.
Witnesses
N. P. Wood.
S. M. Wood.
Inventor
Thomas P. Townley.
Attorneys

UNITED STATES PATENT OFFICE.

THOMAS P. TOWNLEY, OF LAWRENCEVILLE, GEORGIA.

SEED-COTTON CLEANER.

SPECIFICATION forming part of Letters Patent No. 460,669, dated October 6, 1891.

Application filed January 15, 1891. Serial No. 377,908. (No model.)

*To all whom it may concern:*

Be it known that I, THOMAS P. TOWNLEY, a citizen of the United States, residing at Lawrenceville, in the county of Gwinnett and State of Georgia, have invented certain new and useful Improvements in Seed-Cotton Cleaners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to produce a machine that will thoroughly clean seed-cotton before ginning, and that will effectually remove the dirt and adhering pieces of leaves and trash without injuring the fiber, and that will also open the locks and put them in a better condition for ginning.

The invention consists of feeding mechanism, a peculiar arrangement of a toothed cylinder, and a concave consisting of a toothed and grated portions, a fan to promote the discharge of the refuse, and a carrier to elevate the cotton to a sufficient height to be conveniently fed into the gin.

The accompanying drawings illustrate the invention, which will be hereinafter fully described.

In the accompanying drawings, Figure 1 is a side elevation, with a portion of the side broken away to show the interior construction. Fig. 2 shows the opposite side and the arrangement of the pulleys and belt-connections on that side. Fig. 3 shows a side of one of the rakes that carry the seed-cotton up the elevator-flue. Fig. 4 is an enlarged view of the spiked cylinder and concave.

In the figures like reference-marks indicate corresponding parts.

A is a frame that contains most of the operative parts of the cleaning mechanism, on which is a feeder B and an elevating-carrier C. The feeder B is of box form and contains a revolving slatted apron $b$, that runs in the direction indicated by the arrows near the several pulleys and feeds the cotton from the box marked B onto the spiked cylinder D. The belt driving the slatted apron $b$, Fig. 1, is tightened by the pulley $p$ on the lever P, and is fastened in any necessary position by a pin in one of the holes $p'$. The apron $b$ and consequently the feeding may be stopped entirely by lowering the handle of the lever P, thereby loosening the belt. The belt of the cylinder $b'$, Fig. 2, is tightened by the pulleys on the arm S. The arm S is hinged to the frame and a uniform tension is kept on the belt by a weight T, that is connected to the arm by a strap or cord $t$.

The cylinder D is driven by a belt on the pulley $d$, (shown in Fig. 2,) and which by the belt and the several pulleys shown drives the other parts, that consist, besides the feeding mechanism, of the fan E, the elevating-belt F, carrying spiked slats G, and the pulleys $f$ and $f'$.

In the feeder shown the seed-cotton being in the box marked B is carried forward on the belt $b$, the surplus being forced back by the teeth $b''$ on the cylinder $b'$, and is dropped on the cylinder D, and is carried by the spikes $d'$ around over the concave, which concave consists of round bars $h$ and spiked portion $h'$. By the arrangement of the grated and solid spiked parts of the concave as shown an improved result is obtained, namely: The broken leaves and loose trash carried by the cotton are discharged through the grated portion first passed over before they shall have become mixed with the fiber, after which the locks are thoroughly loosened up by passing the solid spiked portion, and the leaves and trash thus disentangled from the cotton are discharged through the second grated surface, over which they pass, the cotton being thrown on the apron M and the dirt and trash through between the bars $h$ into the box-shaped receptacle formed within the frame A. This box-shaped receptacle is open at the bottom to discharge the refuse through a hole in the floor, and the discharge is promoted by the fan E, which runs in the direction indicated. The partition $j$ prevents the air circulated by the fan exerting its force against and through the grated portion of the concave, and the partition J stops the cotton that may be thrown by the top part of the cylinder and leads it to the concave. A bristle-brush $k$ is attached to the top of the partition J to brush any adhering cotton from the slats $b$ and to prevent flying cotton passing through between the slats and the partition. The partition L will stop the cotton that may be thrown upwardly by the spiked cylinder, and will by deflecting it cause it to fall on the belt F. The spikes *g* on the slats G on the belt F will take the cotton from the apron M and carry it up over a screen N and discharge it out of the flue O, whence it may be carried by any kind of a conveyer to the gin or be dropped on the floor. Behind the screen M' and between it and the casing of the flue C is a flue *m*, having a discharge-opening at the bottom, as shown in Fig. 1, for the dust that may pass through said screen.

Having thus described my invention, what I claim as new, and desire to secure by Letters Patent of the United States, is—

1. In a device of the class specified, an apron carried upon revoluble drums, a partition J, set substantially vertical and carrying on its upper edge a brush in close proximity to the upper end of the lower half of said apron, a concave near the lower end of said partition, a spiked cylinder running therein, a partition *j*, extending partially below said concave, with its upper end adjacent to the partition J, and a partition L, set above and substantially radial to said spiked cylinder and in such a position as to form, in connection with the partition J and sides, a chamber above said cylinder, substantially as and for the purpose specified.

2. In a device of the class specified, the concave formed of a grated section *h* and a spiked section *h'*, the spiked cylinder revolving therein, the pulleys *f* and *f'*, carrying belts to which are attached transverse spiked bars, a screen M', set below and substantially parallel to said belt, and a flue formed under said screen by a proper casing, substantially as and for the purpose specified.

In testimony whereof I hereunto affix my signature in presence of two witnesses.

THOMAS P. TOWNLEY.

Witnesses;
A. P. WOOD,
N. P. WOOD.